(No Model.) 4 Sheets—Sheet 1.
A. W. WEEKS.
SHOE TYING AND KNOTTING MACHINE.
No. 329,519. Patented Nov. 3, 1885.
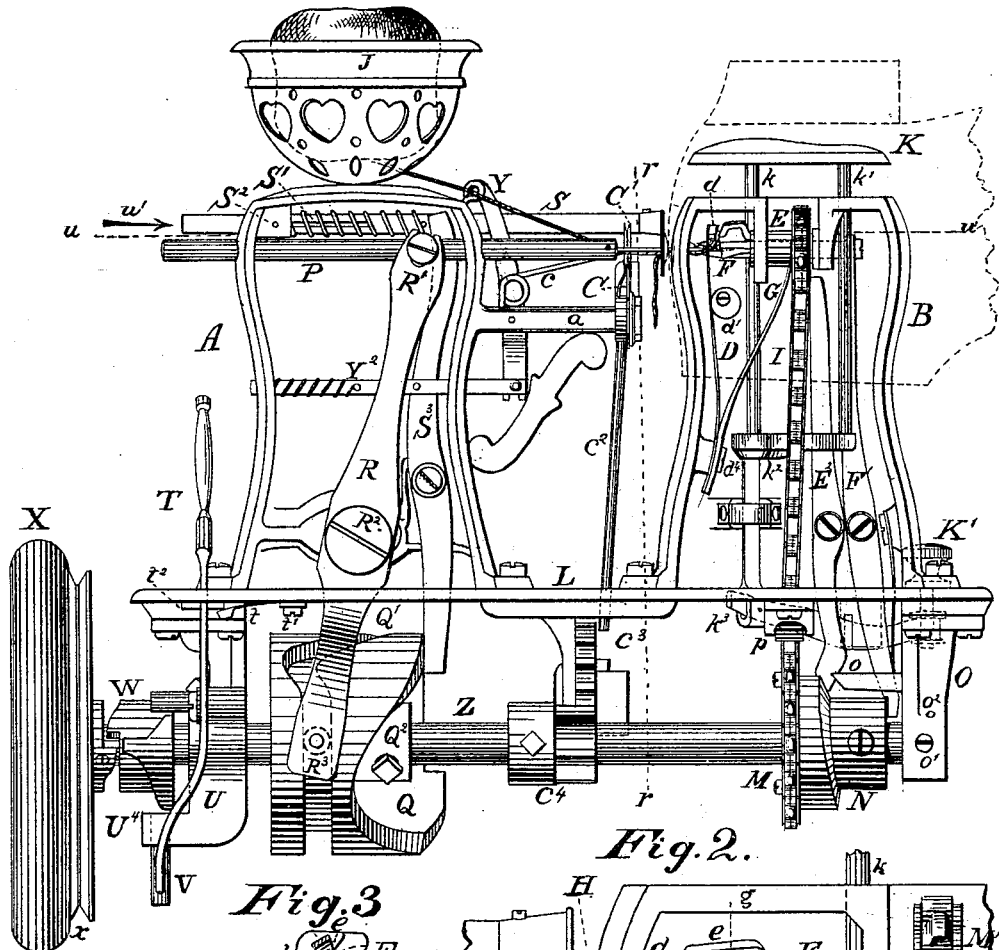
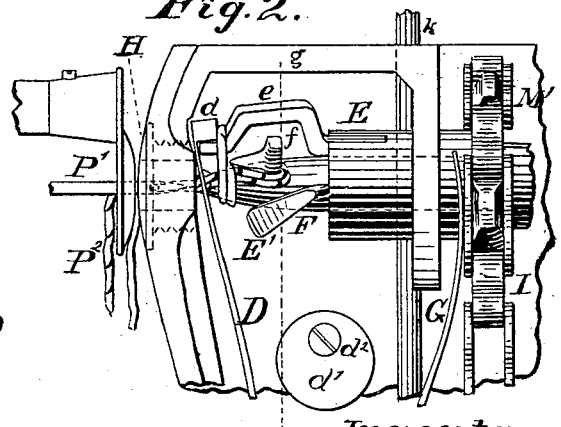
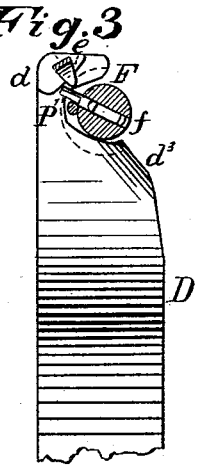
Witnesses:
E. P. Coldwell
J. A. Howard
Inventor:
Albert W. Weeks

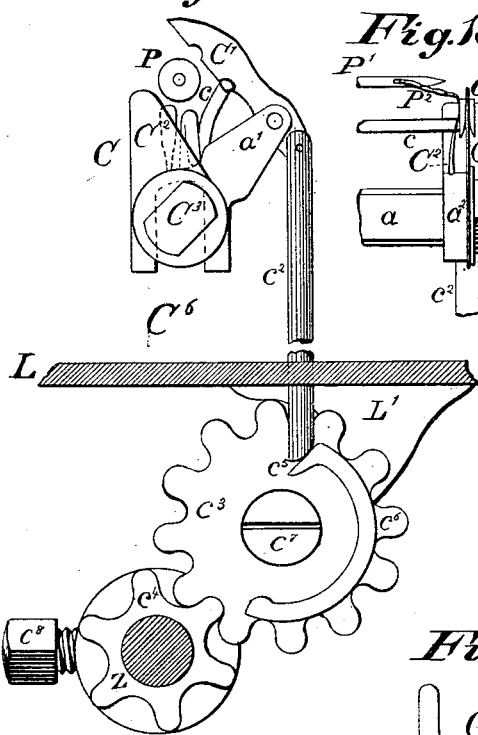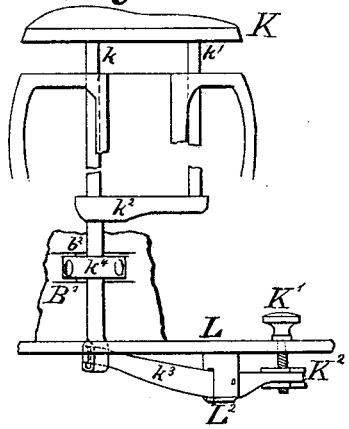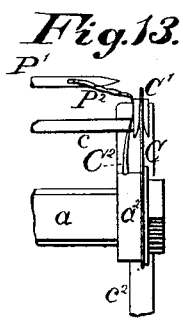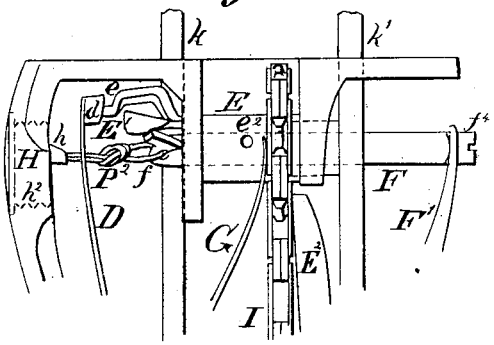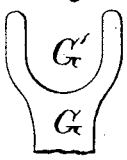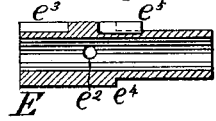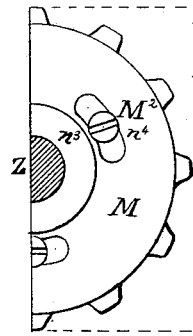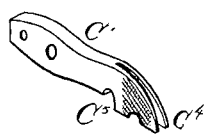

(No Model.) 4 Sheets—Sheet 3.
A. W. WEEKS.
SHOE TYING AND KNOTTING MACHINE.
No. 329,519. Patented Nov. 3, 1885.
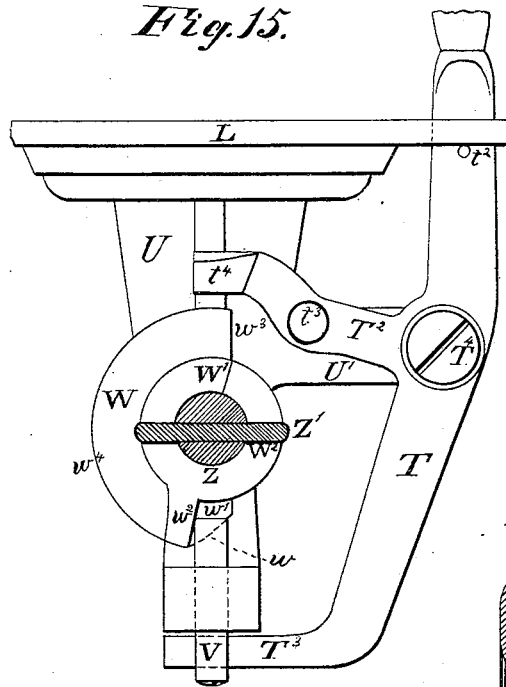
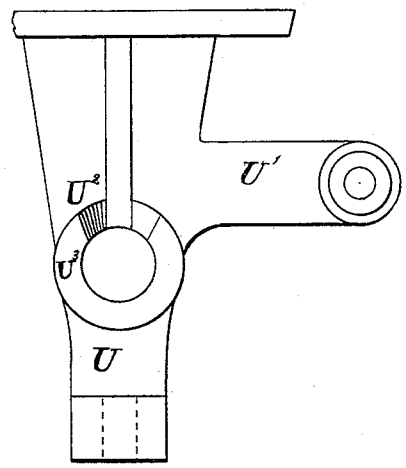
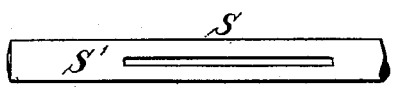
Witnesses:
E. P. Coldwell
J. A. Howard
Inventor:
Albert W. Weeks (No Model.) 4 Sheets—Sheet 4.
A. W. WEEKS.
SHOE TYING AND KNOTTING MACHINE.
No. 329,519. Patented Nov. 3, 1885.
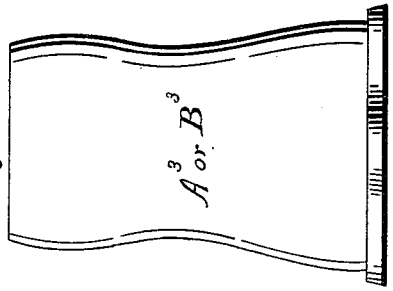
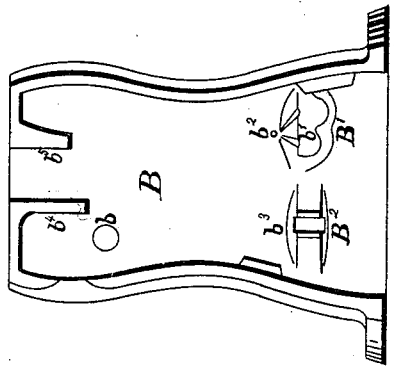
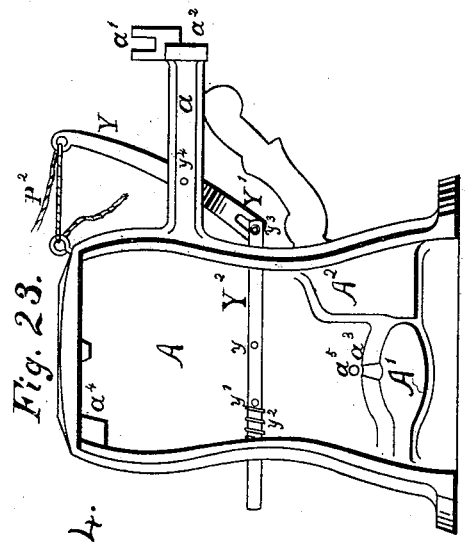
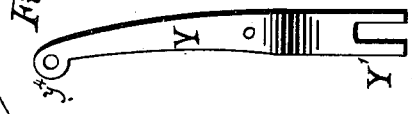
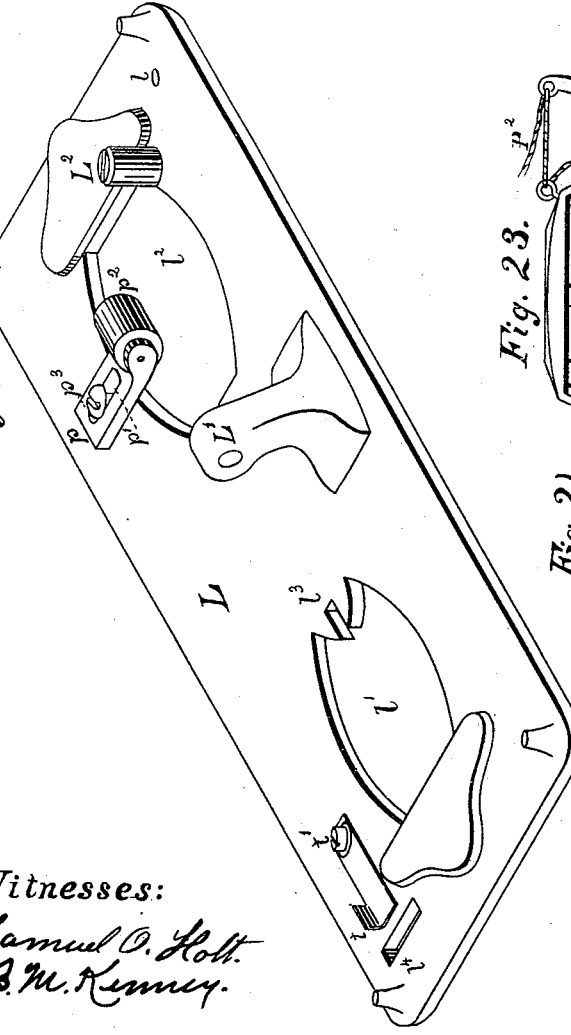
Witnesses:
Samuel O. Holt
B. M. Kenney
Inventor:
Albert W. Weeks

UNITED STATES PATENT OFFICE.

ALBERT W. WEEKS, OF NEWTON UPPER FALLS, MASSACHUSETTS.

SHOE TYING AND KNOTTING MACHINE.

SPECIFICATION forming part of Letters Patent No. 329,519, dated November 3, 1885.

Application filed March 24, 1884. Serial No. 125,313. (No model.)

*To all whom it may concern:*

Be it known that I, ALBERT WALTER WEEKS, recently of Worcester, now residing in Newton Upper Falls, county of Middlesex, State of Massachusetts, have invented new and important Improvements in Shoe Tying and Knotting Machines, of which the following is a full, clear, and concise description.

My inventions appertain to and are improvements upon the shoe-tying machine for which the United States of America granted a patent conjointly to Albert W. Weeks, of Worcester, and Lawrence St. Clair, of Lynn, Massachusetts, said patent being numbered 274,236, and bearing date March 20, 1883.

The object of my improvements is to provide such devices and combination of devices as shall render the operation of tying shoes, or other articles which require to be attached the one to the other, more perfect and complete.

My invention consists in the combination, with a shoe tying and knotting machine, of a spring which so acts in conjunction with the hooks of the knotting device as to prevent the string from slipping off the said hooks while forming the knot.

It further consists in a new and automatic device for stopping the machine every time a knot has been formed.

It further consists of an adjustable head to the standard receiving the shoe, whereby the distance from the inner sole of the shoe to the knot may be easily regulated.

My invention further consists in the combination, with a shoe-tying machine, of a device for cutting off the string every time two shoes have been united—*i. e.*, at the end of every pair.

The improvements further consist in various details and parts and combination of parts, as will be hereinafter fully set forth and described.

Reference is to be had to the accompanying drawings, forming a part of this specification, in which similar letters of reference indicate corresponding parts in all the figures.

Figure 1 is a longitudinal elevation of my improved shoe tying and knotting machine, exhibiting the general outline and principles of the old machine, and also the position, method, and manner of applying and the relation of my various improvements to said old machine. Fig. 2 is an enlarged longitudinal elevation of the knotting device, showing the relation of the spring with the hooks in tying the knot. Fig. 3 is an end elevation and sectional view of the knotting device, made upon the line $g\,g$, Fig. 2, showing the shape and form of the spring which co-operates with the hooks in forming the knot. Fig. 4 is a detailed perspective view of the nipple through which the needle and string pass before forming the knot. Fig. 5 is a detailed longitudinal elevation of the knotting device, showing the knot completed. Fig. 6 is a longitudinal sectional view of the plunger and small hook of knotter, showing also the latter's relation to the nipple. Fig. 7 is a detailed elevation of the upper portion of the spring serving to throw back the sleeve which carries the large hook of the knotter. Fig. 8 is a longitudinal sectional elevation of the sleeve which carries the large hook of knotter. Fig. 9 is a detailed elevation of a portion of the lever which reciprocates the plunger of the knotter. Fig. 10 is a longitudinal and end view of the cams and adjustable wheel which operate the various parts of the knotting device. Fig. 11 is a detailed front elevation of the adjustable head of the knotting-standard. Fig. 12 is a detailed end view of the cutter, made upon the line $r\,r$, Fig. 1. Fig. 13 is a detailed front view of the same, showing the position of the various parts of the cutter when the string is cut. Fig. 14 is a perspective view of the pawl which brings down the string upon the knife in the cutter. Fig. 15 is an end elevation of the device for stopping the machine, showing the operating-lever, with its arms and lugs, and the slotted sleeve which slides upon the main shaft, showing also the main shaft so cut back as to bisect the pin playing in the said slot, by means of which motion is communicated from the said sleeve to the main shaft. Fig. 16 is a detailed perspective view of the sliding sleeve which forms a part of the stop-motion. Fig. 17 is an end elevation of that hanger in which is journaled the main shaft, and which also forms a part of the stop-motion. Fig. 18 is an edge view of the driving-wheel having a quarter-section removed, thereby showing the manner of confining it upon the main shaft. Fig. 19 is an elevated perspective view of the lever operating the needle-bar, showing also the method of connecting therewith. Fig. 20 is a side view of the screw which forms the fulcrum of the above lever. Fig. 21 is an end view of that hanger in which is journaled the main shaft, which also has upon it the guides for staying the lower ends of the levers operating the knotting device. Fig. 22 is a longitudinal elevation of a portion of the grooved presser-foot bar. Fig. 23 is a front elevation, with its lugs and bracket-arm, of the casting containing the needle-bar, &c., showing also a detailed view of the string-distributer. Fig. 24 is a detailed front elevation of the distributer-arm. Fig. 25 is a front elevation of the casting containing the knotting device. Fig. 26 is a front elevation of the cover designed for either of the above castings. Fig. 27 is a perspective view of the base-plate, with its apertures and lugs, upon the top of which the above castings are screwed, and beneath which are secured the above hangers for supporting the main shaft. This figure also shows a detailed view of the adjustable tightening-roller for preventing slackness in the chain operating the knotting device. It further shows a detailed view of the spring forming part of the stop-motion.

The following is a more detailed and minute description of my improvements:

*Description of improvements to the various parts of the knotter.*—The rotating and reciprocating sleeve E has the shoulder $e^4$ and the spline-key $e^5$, provided to secure in position the smaller cog-wheel M′, the former to prevent it being driven out of place by the reciprocating and the latter by the rotating motion of said sleeve, and thus in either case destroying the adjustment of the hooks $e$ and $f$. This sleeve is further provided with the hole $e^2$, through which the plunger F is lubricated, and also with milled groove $e^3$, for receiving and securing the hook $e$. Attached also to this sleeve is the flattened pin E′, for closing down the hook $f$. For securing the accuracy of the motion of this sleeve still further, the wheels M and M′ have been provided with solid cogs and a chain, I, having two long and thin and one short and thick links alternating, the short one adapted to fit between the cogs of said wheels and the longer ones to span said cogs, as shown in Fig. 2. The tightening-roller $p$, consisting of a frame having the slot $p'$ and carrying the friction-roller $p^2$, is provided to take up any slackness which may occur in the chain I, being held in any adjusted position by the screw $p^3$. The flat spring G, having the pronged end G′, adapted to span the sleeve E and rest against the wheel M′, is provided to suddenly throw the said sleeve and wheel in the direction of the arrow $u'$, and thus insure the speedy transfer of the string from one hook to the other, (represented in Fig. 2 as just about to take place.) For the more perfect action of the knotter, the end of the plunger F opposite that carrying the hook $f$ is milled into such a shape as to fit the slotted end $f^5$ of the lever F′, which arrangement, while allowing of reciprocal, effectually prevents rotary, motion. The same end of the said plunger is further furnished with the screw $f^4$, which affords an easy method of adjusting and of attaching said plunger to the lever F′. The opposite end of the plunger F has been tapered and fitted with the hook $f$, having the shoulder $f^2$, upon which the small internal spring rests, and also having the lip $f'$ and the projecting head $f^3$. The nipple H, adapted to permit the needle and string to pass through it before the knot is formed, and also the knot to pass out after forming, is provided with the shoulder $h'$ and the thread $h^2$, by means of which it is firmly fixed in the casting B. This nipple is further provided with the projection or lug $h$, the use of which, together with that of the hook $f$ and the tapered end of the plunger F, and their mutual relations will be more fully set forth hereinafter. For the further accurate working of the knotter, a spring, D, has been secured to the casting B by the screw $a^4$, and designed to operate in connection with and to assist the hooks in forming the knot. The upper end of this spring is so shaped as to fit partially around the plunger F, and to just touch the top of the small hook $f$ when the latter stands at right angles with the plunger F in the position of spring and plunger shown in Fig. 1. At the same time the spring D allows of plenty of room between itself and the plunger F to allow of the free and easy passage of the needle P′ alongside of the plunger, as shown in Fig. 3. The spring D is further furnished with the lug $d$ and the curved lip or corner $d^3$, the purposes of each to be set forth hereinafter. To adjust and yet at the same time to limit the motion of the spring D in the direction of the arrow $u'$, the eccentric disk $d'$ is provided. By turning said disk around and securing it to the lug $b$ by the screw $d^2$ the spring's motion in the said direction can be accurately adjusted. Under the knotter and fastened to the main shaft Z by the set-screw $n^2$ is the combined cam N and the wheel M. The wheel M is fitted upon the shoulder $n^3$, and provided with the slots $M^2$, through which pass the screws $n^4$, by means of which it is firmly secured to the combined cams N. By loosening the screws $n^4$ and on account of the slots $M^2$, the wheel M can be turned around more or less upon the shoulder $n^3$, thus enabling the sleeve E and the large hook $e$ to be readily and accurately adjusted with relation to the cam edges $n^5$ and $n^6$, and through them to the plunger F and small hook $f$. The spiral cam edge $n^5$ and the protuberance $n'$ upon the cam edge $n^6$ and their relations to forming the knot will be more fully described hereinafter. The hanger O has upon its inner surface the projecting guides $o\ o$, between which the lower ends of the levers $E^2$ and F′ play, which levers are thus prevented from being bent or broken when acted upon by the cam edges $n^5$ and $n^6$. The hanger O has, further, the shouldered screw $o'$, which projects into a circular groove cut into and around the end of the shaft Z, thus preventing said shaft from having any reciprocal motion, while permitting it to rotate freely. The hanger O further has the hole $o^2$, which permits oil to be introduced into the above-named groove, which groove acts as a reservoir for lubricating that end of the shaft Z.

*Description of the adjustable head.*—Upon the top of the casting B is the adjustable head K, which is secured to the perpendicular rods $k$ and $k'$. These rods are secured to the head K in a diagonal position, thus permitting the rod $k'$ to pass downward through and within the case B in front of the back end of the sleeve E, and the rod $k$ to pass downward in a similar manner behind the front end of said sleeve, as shown in Fig. 1. This arrangement permits the free play of the knotter, and also of the springs G and D. The lower ends of said rods are secured to the casting $k^2$, having a square shank, which moves within the recess $b^3$ of the lug $B^2$, and which is secured therein by the belt $k^4$ across its surface, the said shank thus forming a guide to the lower ends of the rods $k$ and $k'$. The casting $k^2$ carries upon its lower end a loop, into which passes the end of the lever $k^3$, which latter is pivoted in the split lug $L^2$, cast upon the plate L. The opposite end of the lever $k^3$ is flattened and forked to pass into the grooved edges of the square nut $K^2$, into which screws the milled-headed thumb-screw K', which latter is prevented from moving up or down by a washer secured to it under the plate L. By turning the thumb-screw K' either to the right or left, through the corresponding action of the lever $k^3$, the casting $k^2$, and the rods $k$ and $k'$, the head K is raised or lowered at will.

*Description of the cutter.*—Upon the small hub $a^2$ of the arm $a$ is secured by the screw $C^3$ a knife, C. The said knife C has a diagonal edge, and its lower end is of a forked shape, which latter, in connection with the screw $C^3$, permits it to be readily adjusted or removed for sharpening. Within a slotted lug, $a'$, of the arm $a$ is pivoted the pawl C', which is provided with the slit $C^4$ in one end, and at the same end has two depressions in its lower edge, one for receiving and keeping in position the end of the spring $c$, and the other for receiving and retaining in position the string $P^2$, when the latter is cut. At the slit end of the pawl C' is a milled surface, $C^5$, upon that side of the pawl which is nearest the standard or casting A, and upon the same side of the knife, and adjusted to just touch the milled surface of the pawl when the latter is closed down over the knife, is the spring $C^2$. About perpendicular under the knife and pawl, and secured to the shaft Z by the set-screw $c^8$, the pinion $c^4$ is placed. Diagonally above this pinion, and secured to the lug L' upon the plate L, by the shouldered screw $c^7$, is the wheel $c^3$, which has upon its perimeter just twice as many cogs as has the pinion $c^4$, which drives it, thus giving to the wheel $c^3$ but one revolution for every two revolutions of the pinion $c^4$. The wheel $c^3$ has upon its face the projecting semicircular band $c^6$, provided at one end with the cam edge $c^5$. Designed to come into contact with this cam edge and band, passing up through the plate L, is the rod $c^2$, the upper end of which is slotted and pivoted to the pawl C' at the opposite end from the slit $C^4$.

The workings of these various parts of the cutter will be hereinafter more fully set forth.

*Description of the string-distributer.*—Pivoted upon the same arm, $a$, as carries the cutter is the string-distributer Y, having in its upper end the hole $y^4$, through which the string from the ball contained in the cup J passes. The lower part of the distributer has the forked end Y', to which is attached by means of the shouldered screw $y^3$, the reciprocating rod $Y^2$. This rod is provided at one end with the spiral spring $y^2$, and it is still further provided with the pins $y$ and $y'$. These latter project past the edges of the lever R, as shown in Fig. 1, which lever, by coming into contact with them, gives a reciprocal motion to the rod $Y^2$, which in its turn, gives motion to the string-distributer Y.

The following improvements relate to the presser-foot bar S, the lever R, and the cam Q, respectively: To prevent rotary motion, the presser-foot bar S has the groove S', into which projects the pin $S^2$. As a guide to the lower end of the lever $S^3$, which operates the presser-foot bar, is the slot or groove $l^3$ in the plate L. For strength, security, and to prevent friction, the lever R is pivoted to the lug A' by means of the screw $R^2$, which has the shoulder $R^5$. The upper part of the said lever has the forked end R', and is attached to the needle-bar P by means of the shouldered screw $R^4$. For the reduction of strain upon the lever R in converting the rotary motion of the shaft Z into reciprocal motion, the lower end of the said lever R has been lengthened and curved so as to come over upon the side of the cam Q. The friction-roller $R^3$ is now placed at right angles to the lever R, and enters the cam-groove Q' upon the side of the cam Q, as shown in Fig. 1. The cam Q is secured to the shaft Z by means of the set-screw $Q^2$. The cam-groove Q' has been so modified as to permit the eye of the needle P' to remain within the standard B until such a point in forming the knot as the large hook $e$ has transferred the string $P^2$ from itself to the small hook $f$, the object of this delay in withdrawing the needle P' to be shown hereinafter.

*Description of the stop-motion.*—Upon the main shaft Z, and operating between the hanger U and the wheel X, is the sliding sleeve W. The said sleeve has upon its back edge the lug $w^3$ and upon its front edge the lug W'. It further has upon its cylindrical surface the cam $w$, the cam edge $w'$, the square stop or lug $w^2$, and the band $w^4$. The said sleeve further has the slot $W^2$, in which the pin Z' plays, which pin is driven tightly into and through the shaft Z, thus permitting the sleeve W to have a free reciprocal motion upon the shaft, but preventing any rotary motion, except as both sleeve and shaft turn together. The hanger U has upon that side which is nearest the sleeve W the recess $U^2$. Upon this same side, and directly under the sleeve, is the projection $U^4$, through which plays the slotted pin V. Projecting from the edge of this hanger is the arm U', to which is pivoted by means of the screw $T^4$ the lever T. The upper part of the lever T passes up through the aperture $l^4$ in the plate L, and the said lever has upon its lower part the arms $T^2$ and $T^3$, the latter arm adapted to enter the slot in the pin V. The arm $T^2$ carries upon its surface the wedged-shaped lug or cam $t^4$ and the projecting pin or lug $t^3$. Just beneath the plate L, and passing through the lever T, is the pin $t^2$, and working in connection with this pin is the lipped spring $t$, which is attached to the plate L by means of the screw $t'$. Working in connection with and forming a part of this stop-motion is the wheel X. The said wheel X runs loose upon the shaft Z, and is held thereon and prevented from having any lateral motion by the screw $x^2$, which projects into a circular groove in the shaft Z. The wheel X is further provided with the lug $x'$, the groove $x$, for receiving the driving-belt, and the aperture $x^3$, for admitting oil into the groove in shaft Z.

The operation of the stop-motion is as follows: The upper portion of the lever T is pressed toward the standard or casting A. In the first stages of its motion in this direction the pin V is withdrawn in a downward direction from in front of the cam edge $w'$ and the square stop $w^2$ upon the sleeve W. By this time the thin edge of the cam-lug $t^4$ has reached the lug $w^3$ upon the back edge of the sleeve W. As the lever T is pressed still further in the direction of the casting A, and under the influence of the cam-lug $t^4$ and its contact with the lug $w^3$, the sleeve W is pressed toward the wheel X until their respective lugs $x'$ and W' are interlocked. The rotary motion of the wheel X is now communicated to the sleeve W, and by the pin Z' to the shaft Z. By pressing forward the lever T in the direction indicated the projecting pin or lug $t^3$ has of course been lowered in a like manner and proportion as the lug $t^4$. When, therefore, the shaft and sleeve have made about a semi-revolution, the cam-face $w$ strikes the projecting pin $t^3$, and thus drives the lever T back again into its original position, while the band $w^4$, remaining in contact with the pin $t^3$, prevents the lever from being again pressed in the direction of the casting A during that same revolution of the shaft. By this automatic motion of replacing the lever T the pin V has also been thrown upward into its original position. When, therefore, the shaft Z and sleeve W have nearly completed a revolution, the upper portion of the pin V comes into contact with the cam edge $w'$, by which means the sleeve W is withdrawn from the wheel X until the lugs $x'$ and W' are disconnected. Just after this disconnection the pin V comes into contact with the square stop or lug $w^2$, which stops the shaft every time after one exact revolution has been made.

To prevent a possibility of a disconnection of the lugs $x'$ and W' during the revolution of the shaft Z, the lug $w^3$ comes into contact with the face $U^3$ of the hanger U, and when the sleeve W is slid back under the influence of the pin V and the cam edge $w'$ the said lug $w^3$ passes into the beveled-lipped recess $U^2$ in the said hanger.

As a guard against accidental starting of the machine by some slight or unintentional pressing of the lever T in the direction of the casting A, the lipped spring $t$ upon the plate L has been added. It will be seen that by pressing the lever T in the direction indicated the pin $t^2$ presses down the spring $t$ by coming into contact with the lip of the latter, and by reference to Fig. 1 it will be seen that this said spring is kept pressed down during the whole of the motion of the lever T in the said direction. When the lever T is replaced by the action of the cam $w$, the pin $t^2$ is again brought in front of the lip of the spring $t$, which spring then serves to keep the lever T in this latter position until sufficient force is applied to overcome its resistance. The resistance last named is readily increased or decreased by varying the strength of the spring $t$.

For ease and efficiency in lubricating the pivots of the levers R, $E^2$, and F', the oil-channels $a^3$ and $b'$ are cast into the tops of the lugs A' and B', respectively, and the apertures $a^5$ and $b^2$ have been provided in the backs of the respective castings A and B. Each of the castings A and B is provided with a cover similar to $A^3$, to protect the inclosed mechanism.

The operation of the machine is as follows: By pressing the lever T in the direction of the casting A the machine is started, as above described. Directly the shaft Z begins to rotate the presser-foot is released and firmly pressed against the work, and the needle-bar, under the influence of the lever R and cam Q, begins to move in the direction of the arrow $u'$. At the same time, and under the influence of the lever F' and the cam edge $n^6$, the plunger F is moved in the inverse direction of the arrow $u'$. The instant the lever R began its motion in the direction of the arrow $u'$ the reciprocating rod $Y^2$ of the distributer Y is pressed in the same direction by the action of the spring $y^2$, thus at once giving a slackness of the string $P^2$. By the time the needle-bar has reached the limit of its motion in the direction of the arrow $u'$, having forced the needle and string through the work and passed into the standard B, by this time the plunger F has reached its limit in the inverse direction and the lip $f'$ of the hook $f$ has been pressed tightly against and projects slightly over the lug $h$ of the nipple H, in the manner shown in Fig. 6. This makes the closing down of the hook $f$ impossible while it retains this position. The spring D now just touches the top of the hook $f$, with its lug $d$ just touching and extending back of the projecting head $f^3$ of the hook $f$, as shown in Figs. 1 and 3. During the motion of the needle-bar and plunger above described the sleeve E, by simple rotary motion, has been bringing around the hook $e$ into a position very near the hook $f$. The needle-bar, actuated by its lever and cam, now makes a slight sudden motion in the inverse direction of the arrow $u'$, thus forming a loop in the string $P^2$ just back of the small hook $f$. Owing to the pins $y$ and $y'$ on the distributer-rod $Y^2$ being placed somewhat farther apart than the width of the lever R, this slight inverse motion of the said lever does not affect the distributer Y. The large hook $e$, by its simple rotary motion, passes into the above-said loop and past the back of the hook $f$ in such a way that the end of the hook $e$ just touches the back of the hook $f$. At the exact time that the large hook $e$ has passed the back of the hook $f$ the abrupt part $n$ of the cam edge $n^5$ has been brought against the lower part of the lever $E^2$. Actuated by the lever and cam edge, the large hook $e$ is driven suddenly and closely past the back side of the small hook $f$, as shown in Fig. 1. As the lug $d$ upon the spring D projects back of the hook $f$, as before stated, and in such a manner as to permit the hook $e$ to just go beneath it, as shown in Fig. 3, when the hook $e$ is pushed past the back side of the hook $f$, as described, the lug $d$ presses the loop of the string $P^2$ onto the hook $e$, as shown in Fig. 1. As the sleeve E continues to rotate in a spiral course inversely to the direction of the arrow $u'$, and governed by the cam edge $n^5$, the flattened pin $E'$ passes the back of the hook $f$ without touching, and the string $P^2$ is drawn through the eye of the needle $P'$ behind the hook $f$, which latter is being firmly held in an erect position by the lug $h$. When the hook $e$ in its spiral course has made about half a revolution since entering the loop, it strikes the lip $d^3$ of the spring D; and as the hook $e$ continues its course the spring D is pressed in the inverse direction of the arrow, while the end of the hook $e$ traverses the path of the dotted line shown in Fig. 3. The motion of the hook $e$ continues until it again comes under the lug $d$, and passes in front of and just past the point of the small hook $f$, as shown in Fig. 2. During this latter motion of the hook $e$ the needle has been slightly more withdrawn in an inverse direction of the arrow $u'$, but the eye of the needle is still within the casting B, as is also shown in Fig. 2. By thus, through the agency of the cam-groove $Q'$ and lever R, permitting the eye of the needle to remain as near as possible to the back of the hook $f$ while the large hook $e$ is drawing a supply of string therefrom the minimum of friction and strain is caused to the hook $f$ and the string $P^2$. When the hook $e$ has reached the position shown in Fig. 2, one strand of the string is above and the other below the point of the hook $f$. Exactly at the moment hook $e$ has reached this position the lower end of the lever $E^2$ drops off from the end of the cam edge $n^5$, and under the influence of the spring G the sleeve E and hook $e$ are snapped back in the direction of the arrow $u'$. The lower strand of the string $P^2$ going under the hook $f$, and the top strand coming up against the projected head $f^3$ of the said hook, the loop is completely transferred from the large hook $e$ to the small hook $f$. At the same time that the hook $e$ snaps back the spring D follows it up and assumes its former position, thus pushing the string $P^2$ on and upon the small hook $f$, and holding the string firmly thereon between itself and the projected head $f^3$ of the said hook $f$. This action of the spring D renders the transfer more sure, and at the same time prevents the loop from rebounding off from the small hook $f$. Under the influence of the cam-groove $Q'$ and the lever R the needle-bar P and the needle $P'$ are now rapidly withdrawn in the inverse direction of the arrow $u'$. The lever R, striking the pin $y'$ in the distributer-bar $Y^2$, gives motion to the distributer Y, which thus gathers string for the next knot. Just as the above motion of the needle-bar begins the lower end of the lever $F'$ drops into the recess upon the cam edge $n^6$, and under the influence of the spring pressing the lower end of this lever the plunger F is suddenly snapped in the direction of the arrow $u'$. Just as the plunger F is thrown back the flattened pin $E'$ is directly behind the small hook $f$, and closes said hook down as the plunger falls back. Owing, now, to the inverse motion of the needle-bar, the action of the distributer, the closing down of the small hook $f$, and the tapering shape of the end of the plunger F as the latter falls back, the string is withdrawn from behind the small hook $f$ and the knot formed and tightened, as shown in Fig. 5. As the sleeve E is rotated still more the flattened pin $E'$ passes off from upon the head of the hook $f$, thereby permitting said hook to assume its erect position. At the same time the lower end of the lever $F'$ is brought into contact with the protuberance $n'$ upon the cam edge $n^6$, whereby the plunger F is again slightly advanced in the inverse direction of the arrow $u'$. Any tightness of the string or loop around the hook $f$ is thus slackened and the loop of the completed knot thrown off from the hook $f$. As soon as the needle-bar P, in the inverse motion above described, had withdrawn the point of the needle $P'$ to such an extent as to permit the pawl $C'$ of the cutter to pass it, exactly at that moment did the lower end of the rod $c^2$ come into contact with the cam edge $c^5$ upon the wheel $c^3$. By the action of this cam edge and the rod $c^2$ the pawl $C'$ is lowered directly across the string (which stretches in a line from the needle's eye to the point where the needle entered standard B) in such a way that the said string is held in the indenture which is upon the lower edge and about midway the length of the slit $C^4$ in the pawl $C'$. As the said pawl is pressed still farther down the diagonal edge of the knife C passes up through the slit $C^4$ in the pawl $C'$, thus severing the string. The short end of the string $P^2$, which reaches from the needle's eye to the knife, is now held firmly against the milled surface $C^5$ of the pawl $C'$ by the spring $C^2$, thus preventing the short end from slipping out or being pulled through the eye of the needle. During this operation of the cutter the presser-foot has been withdrawn from the work. At this point, under the influence of the stop-motion, the machine stops, leaving the lower end of the rod $c^2$ of the cutter upon the highest point of the cam edge $c^5$ on the wheel $c^3$, and the pawl $C'$ closed down, as shown in Fig. 13. Upon again starting the machine for the formation of another knot, the needle-bar and needle pass over the pawl $C'$, instead of between it and the knife C, as in the last case, (see Figs. 1 and 12,) the pawl $C'$ being kept down, and the short end of the string thus held firmly by the influence of the band $c^6$, which keeps the rod $c^2$ raised to its highest point. When, at the completion of this second knot, the point of the needle $P'$ is again withdrawn in the inverse direction of the arrow $u'$ to such an extent that its point clears the pawl $C'$, at that moment, by the rotation of the wheel $c^3$, the end of the band $c^6$ passes from under the lower end of the rod $c^2$. The pawl $C'$, under the influence of the spring $c$, is now raised, the short end of the string is released, and the cutter is again in the position shown in Fig. 1, and ready to again sever the string at the completion of the next—i. e., the third—knot, and so on alternately.

It will be seen and understood that the knotting-machine in all its essential parts is applicable for many purposes besides that of tying up shoes—e. g., rubbers, hose, gloves, or any other articles which need to be united in pairs, or by putting two knots into one article to form a loop for suspending the same, or for the further purpose of putting strings into tags, bills, or pamphlets, or, in fact, anything which may need to have a string passed through it with a knot formed at one or at both ends.

The mechanism herein shown for stopping the machine forms the subject of a separate application for patent filed by me March 20, 1885, Serial No. 159,610.

Having thus described my invention, I claim as new and desire to secure by Letters Patent—

1. In combination with a knotting device, a spring, D, of suitable material and shape, adapted to materially assist in forming a knot, substantially as herein shown and described, and for the purpose set forth.

2. In a knotting-machine, the combination of the spring D, having the lug $d$ and the curved lip $d^3$, of the hook $f$, having the lip $f'$, the shoulder $f^2$, and the projected head $f^3$, of a plunger, F, having one end taper and carrying therein the hook $f$, and having the other end milled and fitted with the screw $f^4$, of a sleeve, E, having the shoulder $e^4$, the spline key and groove $e^5$, the groove $e^3$, for receiving the hook $e$, the aperture $e^2$, and the flattened pin E', and of the nipple H, having the lug $h$, the shoulder $h'$, and the screw or thread $h^2$, all arranged to mutually assist in forming a knot, substantially as herein shown and described.

3. In a knotting-machine, the combination, with a spring, D, having the lug $d$ and the lip $d^3$, of an eccentric disk, $d'$, and the screw $d^2$, adapted to adjust the said spring, as shown and described.

4. In a knotting device, the plunger F, having one end tapered and fitted with the hook $f$, and the lever F', having the slot $f^5$ in its upper end, adapted to fit the milled end of the plunger F, and the screw $f^4$, for securing the above lever to the plunger, substantially as shown, and for the purpose set forth.

5. In a knotting-machine, the hook $f$, fitted within the tapered end of the plunger F and having the lip $f'$, the shoulder $f^2$, and the projected head $f^3$, and the nipple H, secured in line with the plunger F, and having the lug $h$, the shoulder $h'$, and the screw $h^2$, adapted to co-operate with the hook $f$ in forming a knot, all substantially as herein shown and specified.

6. In a knotting device, the sleeve E, having the shoulder $e^4$, the spline groove and key $e^5$, the groove $e^3$, for carrying the hook $e$, the aperture $e^2$, and the flattened projecting pin E', and the spring G, having the forked end G', substantially as shown, and for the purpose specified.

7. In a knotting-machine, the combination, with the spring D, the plunger F, and the sleeve E, of the combined cam N, having the set-screw $n^2$, the protuberance $n'$ upon the cam-edge $n^6$, the spiral cam-edge $n^5$, the abrupt portion thereof, $n$, and the shoulder $n^3$, adapted to receive the adjustable wheel M, substantially as herein shown and described, and for the purpose set forth.

8. In a knotting-machine, the combination, with the combined cam N, of the adjustable wheel M, having the slots $M^2$, and adapted to move more or less upon the shoulder $n^3$, the screws $n^4$, for securing the wheel M to the combined cam N, the chain I, having its links arranged the one to fit between and the other to span the solid cogs of the wheels M and M', as shown, and of the tightening-pulley $p$, having the friction-roller $p^2$, the slot $p'$, and the tightening-screw $p^3$, all substantially as herein shown and described, and for the purpose set forth.

9. In a knotting-machine, the combination, with the levers F' and $E^2$ and the combined cam N, of the hanger O, adapted to carry the main shaft Z, and having the guides $o\ o$, the screw $o'$, and the aperture $o^2$, substantially as described, and for the purpose set forth.

10. In a shoe tying and knotting machine, the lever R, having the forked end R' and carrying the friction-roller $R^3$, the pivot-screw $R^2$, having the shoulder $R^5$, the screw $R^4$, for connecting said lever to the needle-bar, a presser-foot bar having the groove S', adapted to receive the pin S², the cam Q, having the cam-groove Q', and the set-screw Q², all arranged to operate at the times and in the manner specified.

11. In a shoe tying and knotting machine, the combination, with a shoe-holding casting, B, of an adjustable head adapted to gage the distance of the knot from the inner sole of the shoe, substantially as shown and described.

12. In a shoe tying and knotting machine, the combination, with a shoe-holding casting, B, having the hangers $b^4$ and $b^5$, of the lug B', having the oil-channels $b'$ and the aperture $b^2$, of the lugs $b$ and B², the latter having the recess $b^3$, of the adjustable head K, the operating-rods $k$ and $k'$, the square-shanked casting $k^2$, having a looped end, the belt $k^4$, and of the lever $k^3$, having one end forked, the grooved nut K², and the milled-headed thumb-screw K', all arranged and adapted to operate the said head K in a manner substantially as shown, and for the purpose set forth.

13. In a shoe tying and knotting machine, the combination, with a standard, A, having the lugs A' and A², of the lug $a^4$, of the oil-channel $a^3$ and the aperture $a^5$, the arm or bracket $a$, carrying upon its end the hub $a^2$ and the slotted lug $a'$, and of the string-holding cup J, substantially as herein shown and described, and for the purpose set forth.

14. In a knotting device, the combination, with a casting, A, having the arm $a$, of the string-distributer Y, having the aperture $y^4$ and the forked end Y', and of the reciprocating distributer-rod Y², having the pins $y$ and $y'$, the spiral spring $y^2$, and the shouldered screws $y^3$ and $y^4$, substantially as shown and described.

15. In a shoe tying and knotting machine, an automatic cutter adapted to sever the tie-string every second knot tied—$i.\ e.$, at the completion of joining every two shoes—substantially as herein shown and described.

16. In a shoe-tying machine, the combination, with the casting A, having the arm $a$, of the automatic cutter C⁶, consisting of the knife C and the pawl C', having the slit C⁴ and the milled surface C⁵, and further consisting of the springs C² and $c$, of the rod $c^2$, the wheel $c^4$, the wheel $c^3$, having twice as many cogs upon its perimeter as the wheel $c^4$, and carrying the cam-edge $c^5$ and the band $c^6$, and of the screws C³ and $c^7$ and $c^8$, all constructed and adapted to co-operate in cutting the tie-string at the times and in the manner specified.

17. In a shoe-tying machine, the base-plate L, having the apertures $l$, $l'$, $l^2$, and $l^4$, the guide-groove $l^3$, the slotted lug L², for carrying the lever $k^3$, and the lug L', for carrying the wheel $c^3$, substantially as shown and described.

18. In a shoe tying and knotting machine, the combination, with the hangers O and U, of a shaft, Z, having around each end a groove adapted, respectively, to receive the screws $o'$ and $x^2$, and having, further, the pin Z', substantially as shown and described.

19. In a shoe tying and knotting machine, the combination, with the base-plate L, of a hanger, U, adapted to support the main shaft, and having the arm U', for carrying the lever T, and of the lipped spring $t$, screw $t'$, and pin $t^2$, all substantially as herein described, and for the purpose set forth.

ALBERT W. WEEKS.

Witnesses:
E. P. COLDWELL,
T. A. HOWARD.